Nov. 14, 1944.  K. BERGER  2,362,531
PIN RETAINER LATCH FOR FAIRLEADERS
Filed Jan. 18, 1943
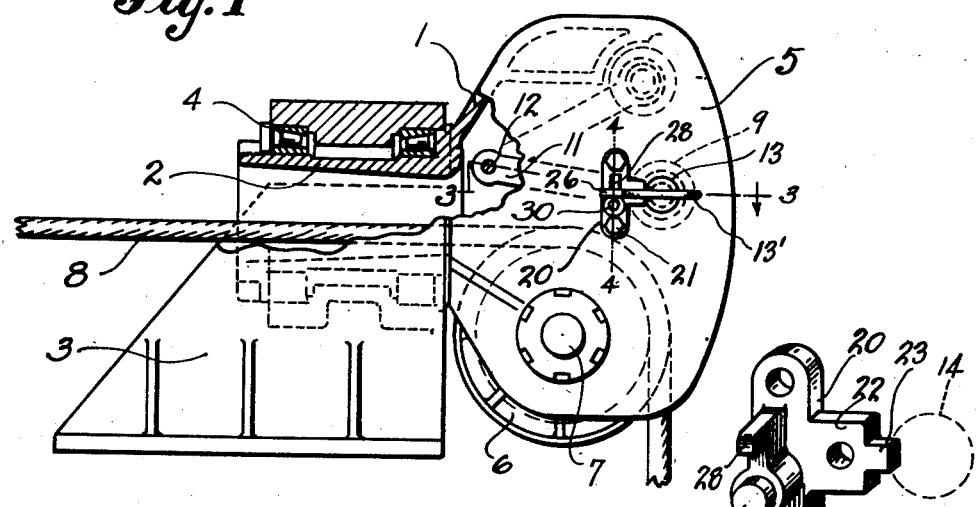
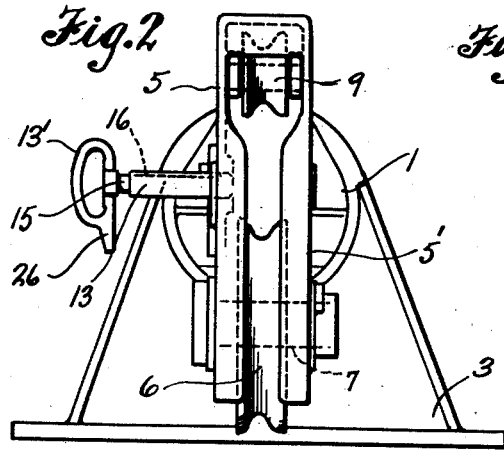
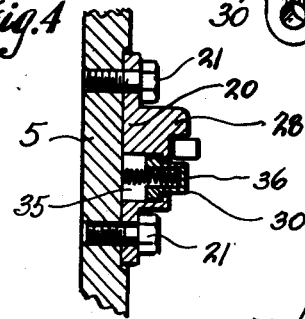
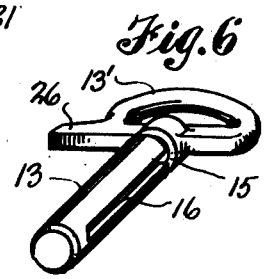
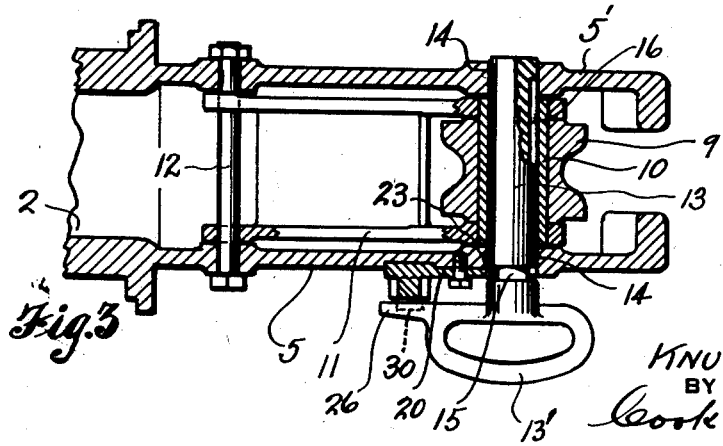
INVENTOR
KNUTE BERGER
BY
Cook & Robinson
ATTORNEY Patented Nov. 14, 1944

2,362,531

UNITED STATES PATENT OFFICE 2,362,531

PIN RETAINER LATCH FOR FAIR-LEADERS

Knute Berger, Seattle, Wash.

Application January 18, 1943, Serial No. 472,663

6 Claims. (Cl. 254—190)

This invention relates to pin or key latches and has reference more particularly to means whereby a pin, key, or shaft as mounted in a frame, for example, as a retainer, or as a mounting for a wheel axle or lever, may be secured against accidental displacement from its mounting or support; it being the principal object of this invention to provide a combination of pin and manually releasable latch that is practical and positive in its intended use, and which permits of easy and quick release for withdrawal of the pin as required for the removal of the member mounted or fixed in place thereby.

Specifically stated, the objects of the present invention reside in the novel details of construction of a pin and a manually releasable latch therefor that is designed for use in conjunction with fairleaders of that kind disclosed in my U. S. Patent No. 1,805,800, and also fairleaders as shown in my copending application for patent filed on even date herewith under Serial No. 472,664.

Other objects of the present invention reside in the details of construction of the various parts and in their combination as hereinafter described.

In accomplishing these and other objects of the invention, I have provided the improved details of construction, the preferred forms of which are illustrated in the accompanying drawing, wherein—

Fig. 1 is a side view of a fairleader with which a pin and a pin locking and retainer means embodied by this invention is employed; parts being shown in section for better illustration.

Fig. 2 is an end view of the fairleader with the pin withdrawn.

Fig. 3 is an enlarged, sectional detail in the horizontal plane of line 3—3 in Fig. 1.

Fig. 4 is a cross section on line 4—4 in Fig. 1, showing the latch stop and button.

Fig. 5 is a perspective view of the latch plate.

Fig. 6 is a perspective view of the pin.

Referring more in detail to the drawing—

In Fig. 1, I have illustrated a fairleader of the type disclosed in my U. S. patent above mentioned, and embodying certain parts like those of the aforementioned copending application. This device comprises a swivel frame, or housing 1 having a cylindrical mounting hub portion 2 that is rotatably mounted in a rigid support or base structure 3 by sets of anti-friction bearings 4, so that the swivel housing 1 may rotate pivotally about the axial line of its hub, thus to provide for self-alinement of the sheave and cable as presently understood. Integral with the hub 2, as a part of the swivel housing, are side walls 5 and 5' disposed in spaced, parallel planes that are at opposite sides of and parallel with the axis of the hub, and between which walls, a sheave wheel 6 is rotatably mounted on a pivot bolt 7, and a cable 8 is extended longitudinally through the tubular hub 2 and passes downwardly over the sheave as illustrated.

It is desirable, in this device, that the pull of the cable, as applied in its passing down from the sheave, be eccentric of the hub axis, thereby to insure the pivotal action for the automatic, self-alinement of the sheave with the cable. Therefore, in this disclosure, I have provided a guide roller 9, revoluble on a tubular axle 10 that is carried at one end of a swing frame 11. This frame is located between the side walls of the swivel frame and is pivotally mounted at the other end on a pivot bolt 12 extended through the frame walls. To retain the guide roller in proper functional relationship with the cable where it passes over the sheave wheel, I have provided the present locking pin 13 that is extended through openings 14 in the walls of the swivel housing and through the tubular axle 10 as best shown in Fig. 3.

It will be explained that it is desirable that this pin be removable from the axle in order to free the swing frame and thus permit the guide roller to be adjusted away from sheave wheel 6 as is desirable for threading the cable through the device; this adjustment being indicated in Fig. 1 by the dotted line showing of the swing frame in its upper position.

By reference more particularly to Fig. 3, it will be understood that the pin 13 is round in cross section and is of uniform diameter throughout its length, so that it may be fitted within and slipped into or from the openings of the housing walls and through the tubular axle, and may also be rotated therein. At one end, hereinafter designated as its outer end, the pin is formed with a loop handle 13', and adjacent this, it is formed with a square-cut, circumferential channel 15. Also, the pin is provided with a longitudinal channel 16 which extends from near the inner end of the pin to the channel 15 and opens into the latter as shown in Fig. 6.

Fixed on the wall 5 at the outside and adjacent the opening 14 provided therein for the reception of the pin, is a latch plate, or casting 20, held secure by bolts 21—21 that are threaded into the wall plate 5. Extending laterally from this plate 20 is an arm 22 that terminates in a square ended key 23 that overlaps the wall opening 14 to a slight extent, as indicated in Fig. 5. This key, at its end, is of such dimensions that it may be received in the pin channels 15 and 16, and due to its being extended slightly across the periphery of the wall opening 14, it becomes necessary in applying the pin to the housing, that the pin be first inserted, then the latch plate is applied to the wall 5 with the key registered in the channel 15 or channel 16, and then secured by its bolts 21. Pushing the pin inwardly to its full extent brings the key 23 into the circumferential channel 15 and then, by rotating the pin, the channel 16 will be moved out of registration with the key and the latter will then act as a retainer whereby the pin is held against being pulled out from the wall plate 5.

It is desirable, therefore, that some practical means be provided to hold the pin 13 in its locked position of rotation until it is desired that it be manually released. For this purpose, I have provided the pin with handle 13' at its outer end, and this, as seen best in Fig. 6, has an extension or arm 26 which projects to that side of the pin that is opposite the side containing the longitudinal channel 16. The arm 26, by rotation of the handle through an angle of 180° from its applying position, will be engaged against a stop 28 that extends outwardly from the top end of the plate 20. Beneath the stop, a definitely spaced interval, is an inwardly yieldable latch button 30 designed to project to the under side of the arm 26 when the arm is against the stop, thus to hold the handle against rotation and keep the pin in this locked position.

The latch button, as seen in Figs. 4 and 5, is contained slidably in a socket or bore 35 in plate 20, and it has an outer end portion of reduced diameter extended out through an opening in the plate. A shoulder on the button limits its outward movement and a coiled spring 36 held under compression within the button and bore, urges the button to its outwardly extended position.

Assuming that the pin 13 has been applied and is in its locked position, as in Figs. 3 and 4, to release it for withdrawal from the tubular hub of the swing frame, it is only required that the button 30 be depressed to free the arm 26 so that the handle may be rotated back through the arc indicated in Fig. 1, thereby to again bring the channel 16 into alinement with the retainer key 23 thus permitting the pin to be withdrawn, as seen in Fig. 2, to the extent permitted by the slot 16. The slot 16 extends sufficiently near the inner end of the pin that it can be entirely withdrawn from the hub or axle of the roller, but is retained in the hole 14 in plate 5. To entirely remove the pin, it is required that the latch plate be detached.

While I have shown this latch device as applied to a pin for a specific purpose, it may be likewise applied to shafts, keys or pins of various kind and used in many ways different from that herein shown, without departing from the spirit of the invention.

The special advantages of this construction reside in the fact that the pin may be easily and readily adjusted, and can be locked in a fixed position by an easily, manually operated means.

Having thus described my invention, what I claim as new therein and desire to secure by Letters Patent is:

1. In combination, a housing comprising walls formed with holes for mounting a pin, or the like, a latch plate fixed to the housing, a key extended from the plate into the line of the holes, a stop lug extended outwardly from the plate, a pin slidably and rotatably fitted in said holes and having a channel longitudinally thereof from near its inner end for travel of the said key therein in withdrawal of the pin, and having a circumferential channel into which said longitudinal channel opens and into which said key will move upon fully inserting the pin and along which the key will move on rotation of the fully applied pin to lock it against withdrawal, a handle member on the outer end of the pin including a lateral extension designed to engage the said stop on rotation of the pin to locked position, and a yielding latch engageable with said extension to hold the pin against releasing rotation.

2. In combination, a housing formed with holes for mounting a pin, or the like, a plate fixed to the housing, a key extended from the plate into the line of the holes, a stop lug extended outwardly from the plate, a pin slidably and rotatably fitted in holes and having a channel longitudinally thereof receiving said key for travel therealong in the adjustment of the key between withdrawn and fully applied positions, and having a circumferential channel into which said longitudinal channel opens and into which said key will be received on rotation of the fully applied pin, a handle member on the outer end of the pin formed with a lateral extension designed to engage the said stop on rotation of the fully applied pin to locked position, a socket in the said plate spaced from the said stop, a latch button mounted in said socket, and a spring acting against said button to urge it outwardly, whereby to engage the said handle extension and retain it against the stop to prevent release rotation of the pin.

3. In a device of the character described, a sheave housing comprising opposite side walls, a sheave wheel in said housing, a cable passed over the sheave, and a guide roller mounted in the housing to retain the cable on the sheave; said roller having a tubular axle, a swing frame pivoted at one end in the housing and mounting the said axle at its other end; said housing having aligned openings in its side walls with which the said tubular axle will be alined when the guide roller is in position, and a pin removably applied through said housing openings and through the tubular axle to retain the roller in place.

4. A device as in claim 3 wherein a key projects from one housing wall into the line of the pin opening therein, and the pin is longitudinally slidable and rotatably fitted in the openings and axle for endwise adjustment and is formed with a longitudinal channel containing the key for travel therealong in its longitudinal adjustment between releasing and fully applied positions, and has a circumferential channel to which the longitudinal channel opens and into which said key will move on fully applying the pin, and into which it will move on rotation of the pin to lock it against withdrawal, and a latch device for holding the pin against rotation when in locked position.

5. In a fairleader of the character described, a housing comprising spaced side walls, a cable sheave mounted between said walls, a cable passing over said sheave, a swing frame in the housing, pivotally mounted at one end and adapted to swing at its outer end from and toward the cable sheave, a tubular hub mounted on the frame and a cable retaining roller on said hub; said housing walls having holes therein with which the tubular hub is alined when the roller is in cable retaining position, and a pin extended through the holes of the housing and the tubular hub; said pin having a longitudinal channel and a circumferential channel into which said longitudinal channel opens at one end, a key fitted to a wall of the housing and received in the longitudinal channel for withdrawal of the pin and received in the circumferential channel on rotation of the pin when it is fully applied, to lock it against withdrawal.

6. A fairleader as in claim 5 wherein a stop is mounted on the housing, and said pin has a lateral arm to engage the stop when in locked position, and a releasable latch engages the arm to hold it against the stop.

KNUTE BERGER.